Sept. 13, 1955     W. E. MARTIN     2,717,802
BRACKET FOR FLAT BED TRAILERS
Filed Dec. 4, 1951     2 Sheets—Sheet 1
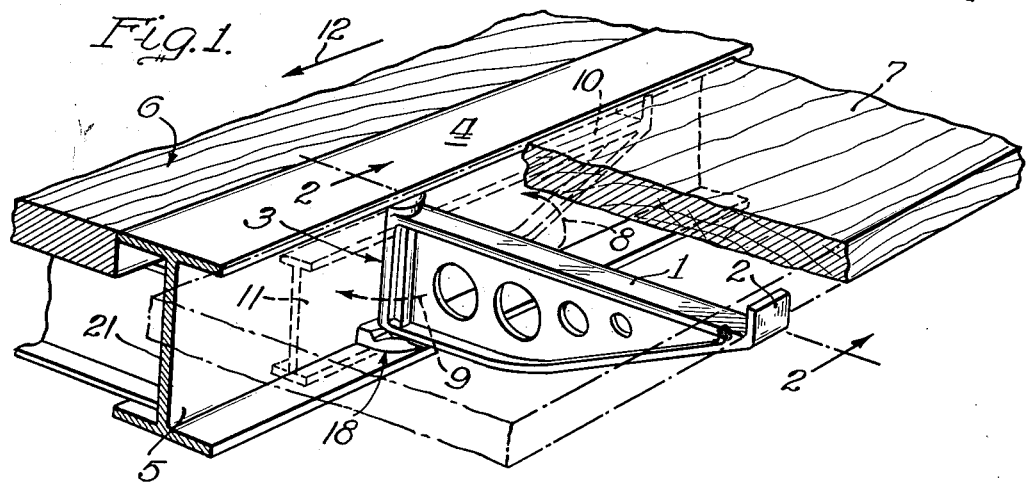
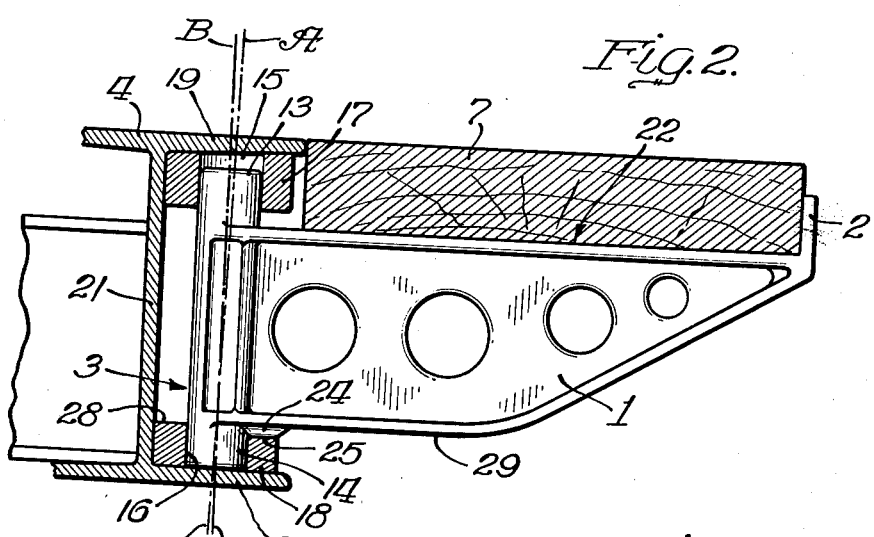
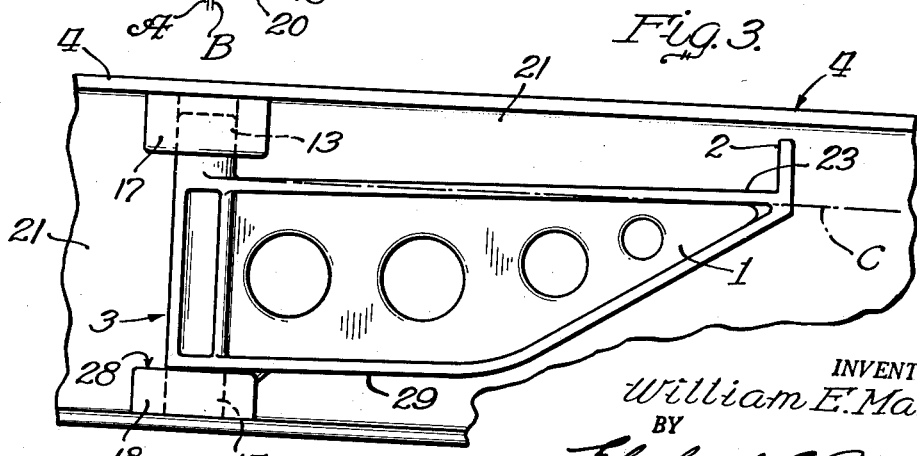
INVENTOR.
William E. Martin
BY
Eberhard E. Wettley
Atty.

Sept. 13, 1955  W. E. MARTIN  2,717,802
BRACKET FOR FLAT BED TRAILERS
Filed Dec. 4, 1951
2 Sheets-Sheet 2
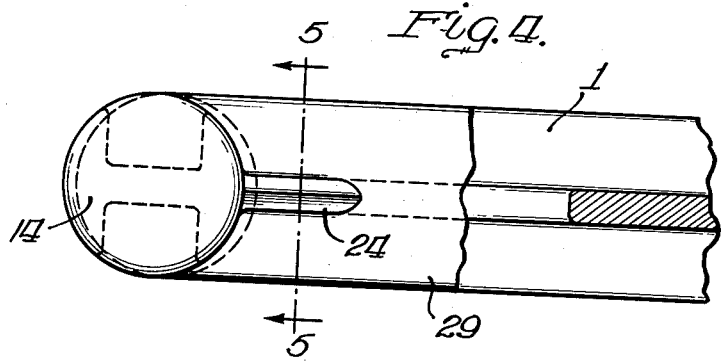
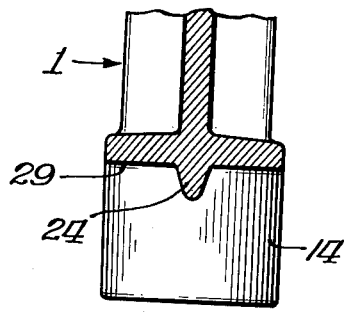
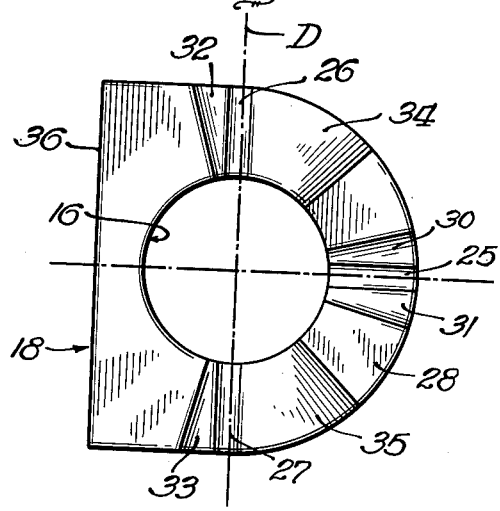
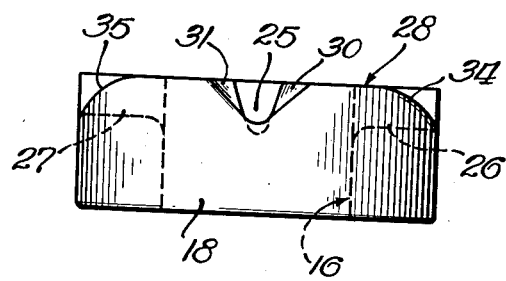
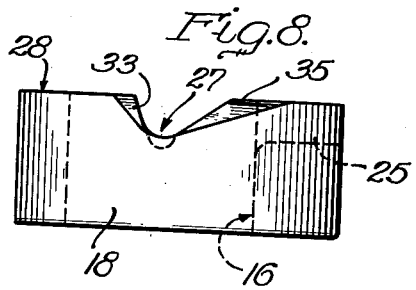
INVENTOR.
William E. Martin
BY
Eberhard E. Welty
Atty.

United States Patent Office 2,717,802
Patented Sept. 13, 1955

2,717,802

BRACKET FOR FLAT BED TRAILERS

William E. Martin, Kewanee, Ill.

Application December 4, 1951, Serial No. 259,798

5 Claims. (Cl. 296—28)

This invention relates to a swingable bracket having coactive supporting means to conveniently preposition the bracket in operative or inoperative positions.

More specifically the invention is directed to a bracket arranged for connection with one edge of a machinery hauling flat bed trailer to carry auxiliary means providing a coplanar bed extension to thus increase the overall width or length of the hauling surface of the trailer.

One of the main objects of the invention is to provide a cantilever bracket having a pivotal mounting which permits quick manual shifting between operative and inoperative positions automatically supplemented by automatic detent structure to releasably retain said bracket in either of its positions.

Another object of this invention is to provide a bracket structure that utilizes its own weight in association with position limiting means to maintain the bracket in an extended operative position or in at least one non-extended inoperative position.

Other objects of the invention relates to the provision of an angular pivotal axis arrangement for the bracket to supplement the detent structure in holding the bracket in predetermined positions with respect to its supporting structure; to the provision of few inexpensive parts; to the provision of such parts that are rugged and readily assembled; and to such objects and advantages that will hereinafter appear in the following detailed description having reference to the accompanying drawings comprising a part of this specification.

In the drawings:

Fig. 1 is a perspective view of the bracket comprising this invention and illustrating one adaptation of the same in conjunction with one edge of a flat bed trailer;

Fig. 2 is a cross sectional view at the bracket and adjacent bed assembly substantially as viewed along the line 2—2 in Fig. 1;

Fig. 3 is a detail assembly view of a fragmentary portion of the trailer bed and the connected bracket to illustrate further details of construction and operation of the bracket assembly;

Fig. 4 is a fragmentary bottom view of the pivotal end portion of the bracket;

Fig. 5 is a cross sectional view of a fragmentary portion of the hinge or pivotal end of the bracket substantially as seen along the line 5—5 in Fig. 4;

Fig. 6 is a plan view of the detent hinge block per se used to preposition the bracket with respect to the bracket supporting structure;

Fig. 7 is a front elevational view of the hinge block as seen from the right in Fig. 6; and Fig. 8 is a side elevational view of the hinge block as viewed from the lower edge thereof in Fig. 6.

The swingable bracket of the present invention is best illustrated in Fig. 1 and comprises a supporting beam 1 terminating in an upstanding retaining flange 2 at the outer end thereof and having a pivotal mounting structure 3 connected with a supporting structure 4. The supporting structure 4 comprises a side rail or beam 5 of a flat bed trailer 6 and the supporting beam 1 of the bracket in this particular application is arranged for supporting additional planking such as 7 in coplanar alignment with the flat bed 6 to extend the hauling capacity of the bed of the trailer.

As shown in Fig. 1, the bracket supporting beam 1 is extended substantially at right angles to the supporting structure 4 which is the operative position in which this bracket is utilized, and the same can be revolved according to the arrows 8 or 9 to occupy either of the retracted or inoperative positions such as 10 and 11 respectively. The position 10 is preferable when the bracket or supporting beam 1 is not in use assuming that the forward motion of the trailer is in the direction of the arrow 12. The pivotal structure 3, however, is made to provide left and right hand detent mechanism so that the same elements may be used on either side of a trailer bed to be universally right or left hand without change in the construction of the bracket unit.

As best illustrated in Fig. 2, the pivotal mounting structure 3 comprises a pair of aligned bosses 13 and 14 which extend oppositely outwardly in a generally vertical direction from the supporting beam 1 and which are aligned for pivotal operation within the apertures 15 and 16 of a pair of hinge blocks 17 and 18 respectively.

The hinge blocks 17 and 18 are welded or otherwise secured to the spaced flanges 19 and 20 of the supporting structure 4 and if desired, one or both of these hinge blocks may be removably secured to their respective flanges to suit certain conditions of operation.

As best seen in Fig. 2, the bosses 13 and 14 that provide the aligned trunnion members upon which the bracket is hinged are aligned upon an axis A which is tilted upwardly and outwardly from a truly vertical axis such as B parallel to the web 21 of the supporting structure so that the supporting beam 1 is normally gravitationally urged into the outwardly extended positions as shown in Figs. 1 and 2. With the openings 15 and 16 aligned to receive the trunnion bosses 13 and 14 upon the axis A and in the plane of the bracket as shown in Fig. 2, and with the top surface 22 of the supporting beam 1 horizontally located, the bracket assumes a position as shown in Fig. 3 when the same is revolved against the web 21 of the supporting structure 4. In this position, the outer end 23 of the supporting beam 1 is raised above a true horizontal plane as indicated by the line C so that the tendency of the bracket will be to turn outwardly when grapsed by the hand to assume its extended position as illustrated in Fig. 2 as aided by the forces of gravity.

It should be further noted that the blocks 17 and 18 are so spaced as to provide for limited vertical motion of the bracket in its entirety, thus permitting endwise shifting of the bosses 13 and 14 within their respective apertures 15 and 16.

Referring now to Figs. 4 to 8 inclusive, it should be noted that the bracket supporting beam 1 is provided with a projection 24 which extends radially outwardly from the boss 14 and along the bottom of the supporting beam. The bottom hinge block 18 is provided with depressions in the upper surface thereof consisting of the slots 25, 26 and 27, and these slots are formed into the upper surface 28 of the hinge block 18 which upper surface is normally disposed adjacent the lower surface 29 of the supporting beam 1 and from which the detent or projection 24 depends.

Flanking the slot 25 are a pair of upwardly and outwardly angling surfaces 30 and 31 which are best illustrated in Figs. 6 and 7. Slots 26 and 27 are also flanged by rather steep upwardly and outwardly angling surfaces 32 and 33 respectively and by further adjacent upwardly and outwardly extending angling surfaces 34 and 35, which present less abrupt slopes on the sides of the slots 26 and 27 facing the central detent slot 25.

By the cooperation of the bracket as a unit and by its own weight, the projection 24 is held downwardly against the block 18 and by rotating the bracket 1, it is possible to cause the projection 24 to enter any one of the slots 25, 26 or 27. When the projection 24 is engaged in a slot, the bottom surface 29 of the supporting beam 1 seats upon the upper flat surface 28 of the block 18 and the bracket is, therefore, held in operative or retracted position from which it will not wander unless the bracket is bodily lifted to release the detent structure comprising projection 24 from one of the detent slots in the hinge block 18.

Furthermore, when the bracket is revolved as indicated in the position 10 in Fig. 1, the detent projection 24 is seated within the slot 26 and an operator may easily swing the bracket into its outwardly extended and operative position by grasping the outer end thereof and swinging the same into the position wherein the projection 24 drops into the slot 25. Although the bracket structure itself has been reduced considerably in total weight without impairing its supporting capacities, such bracket is still of sufficient weight so that the ease of use thereof by an operator has been considered in the construction thereof. It is for this reason that the sloping surfaces 34 and 35 adjacent the retention slots 26 and 27 provide a gradual camming lift to raise the bracket upwardly through the projection 24 so that the bracket will thereafter definitely drop into the operative retaining slot 25. This particular swinging action of the bracket is further augmented by the forward tilting of its hinge structure so that the outer end of the bracket which is actually raised as shown in Fig. 3 will have a tendency to gravitationally aid in swinging the bracket outwardly into its extending relation with respect to its supporting structure.

Although the bracket, when in extended position as shown in Figs. 1 and 2, will require a direct lift to release the projection 24 out of the slot 25, it must be understood that this bracket when so extended is much more accessible and convenient for grasping by an operator to cause the detent release thereof and swinging of the bracket into an inoperative position such as 10.

The sloping surfaces 32 and 33 are rather abrupt to prevent further angular swinging of the bracket, and as seen in Fig. 6, it should also be noted that both of the slots 26 and 27 are located slightly to the left or toward the rear portion 36 of the block 18 in respect with a radial axis D which will, therefore, have the tendency to angle the bracket slightly inwardly toward the web 21 of the supporting structure 4 when the bracket is carried in inoperative position as at 10 in Fig. 1. This helps to nest the outer free swinging end of the bracket and to prevent accidental contact therewith. Furthermore, the two flanking slopes 30 and 31 adjacent the bracket slot 25 are relatively steep enough to maintain the bracket in its operative position when the projection 24 is in the slot 25. In this connection, it might also be stated that although the slopes 30 and 31 are rather steep, they do provide a lifting cam action to help raise the bracket in its entirety when the operator moves the same from the extended position shown in full lines in Fig. 1 to the broken line position shown at 10 therein.

The foregoing description is directed to a preferred embodiment of the invention such as disclosed in the drawings, certain changes and modifications in the various parts of this bracket construction together with the combination of elements used are contemplated. However, all such changes shall be governed by the breadth and scope of the appended claims.

What I claim is:

1. In a load carrying vehicle bed having a longitudinally arranged edge structure including at least two vertically spaced flanges projecting laterally outwardly from the bed, the improvement consisting of a plurality of bracket units to support bed widening elements to extend the load carrying surface of said bed, said bracket units each comprising a rigid bracket positioned in an upright plane, bosses integrally connected with said bracket and extending oppositely outwardly from said bracket and in an upright direction, bracket mounting means connected with adjacent faces of said spaced flanges comprising apertured bearing blocks to receive said bracket bosses therein and between said flanges, and detent means carried by said bracket and one of said apertured bearing blocks respectively to preposition said bracket with respect to said flanges and upright therebetween, said detent means being rendered inoperative by bodily vertical movement of said bracket relative to said bearing blocks and between said flanges, and said bearing block spacing and the overall height of the bosses on said bracket being arranged to permit angular regulation of said bracket upon said bosses with respect to the flanges of said vehicle bed through the release of said detent means upon bodily vertical manipulation of said bracket.

2. In a load carrying vehicle bed having a longitudinally arranged edge structure including at least two vertically spaced flange members projecting laterally outwardly from the bed, the improvement consisting of a plurality of bracket units to support bed widening elements to extend the load carrying surface of said bed, said bracket units each comprising a rigid bracket positioned in an upright plane, bosses integrally connected with said bracket and extending oppositely outwardly from said bracket and in an upright direction, bracket mounting means connected with adjacent faces of said spaced flange members comprising apertured bearing blocks to receive said bracket bosses therein and between said flange members, and detent means carried by said bracket and one of said apertured bearing blocks respectively to preposition said bracket with respect to said flange members and upright therebetween, said detent means being rendered inoperative by bodily vertical movement of said bracket relative to said bearing blocks and between said flange members, and said bearing block spacing and the overall height of the bosses on said bracket being arranged to permit angular regulation of said bracket upon said bosses with respect to the flange members of said vehicle bed through the release of said detent means upon bodily vertical manipulation of said bracket, one of said bearing blocks having slots therein to selectively receive said detent means carried by said bracket to position said bracket relative to said bed, said slot locations providing at least one protectively housed position of said bracket between said longitudinal flange members and at least one operative position for said bracket in angular and outwardly extended relation with respect to said flanges.

3. In a vehicle having a load carrying bed with structural edge forming elements having vertically spaced flange members extending longitudinally of said bed and outwardly therefrom, the improvement which consists of swingable bracket units interposed between said flange members and arranged for storing disposition in line with and between said flange members while not in use and for supporting additional bed forming elements to enlarge the load carrying surface of said bed when in operative extended positions, said swingable bracket units each comprising a bracket, aligned bosses connected with one end portion of said bracket and extending oppositely upwardly and downwardly from said bracket and provided for disposition between said flange members, the overall height of said boss portion of said bracket being fixed and less than the distance between said flange members to allow for bodily vertical shifting of said bracket and bosses between said flange members, apertured bearing blocks secured to said flange members to receive said bosses and to swingably mount said bracket, and detent means to position said bracket in housed or in operative positions respectively in relation to said flange members, said detent means being constructed and arranged to permit selective swinging movement of said bracket upon bodily vertical shifting of the bracket and bosses relatively to said bearing blocks upon bodily vertical manipulation of said bracket.

4. In a vehicle having a load carrying bed with structural edge forming elements having vertically spaced flange members extending longitudinally of said bed and outwardly therefrom, the improvement which consists of swingable bracket units interposed between said flange members and arranged for storing disposition in line with and between said flange members while not in use and for supporting additional bed forming elements to enlarge the load carrying surface of said bed when in operative extended positions, said swingable bracket units each comprising a bracket, aligned bosses connected with one end portion of said bracket and extending oppositely upwardly and downwardly from said bracket and provided for disposition between said flange members, the overall height of said boss portion of said bracket being fixed and less than the distance between said flange members to allow for bodily vertical shifting of said bracket and bosses between said flange members, apertured bearing blocks secured to said flange members to receive said bosses and to swingably mount said bracket, and detent means to position said bracket in housed or in operative positions respectively in relation to said flange members, said detent means being constructed and arranged to permit selective swinging movement of said bracket upon bodily vertical shifting of the bracket and bosses relatively to said bearing blocks upon bodily vertical manipulation of said bracket, said bearing blocks being connected with said flange members for pivoting said bosses upon an axis tilted out of vertical position and in a plane coincident with at least one of the detent positions occupied by said bracket relatively to said flange members whereby the inherent weight of said bracket in the plane of the tilt gravitationally aids to retain said bracket against swinging when in such position.

5. In a load carrying vehicle bed having a longitudinally arranged edge structure including at least two vertically spaced flanges projecting laterally outwardly from the bed, the improvement consisting of a plurality of bracket units to support bed widening elements to extend the load carrying surface of said bed, said bracket units each comprising a rigid bracket positioned in an upright plane, bosses integrally connected with said bracket and extending oppositely outwardly from said bracket and in an upright direction, bracket mounting means connected with adjacent faces of said spaced flanges comprising apertured bearing blocks to receive said bracket bosses therein and between said flanges, and detent means carried by said bracket and one of said apertured bearing blocks respectively to preposition said bracket with respect to said flanges and upright therebetween, said detent means being rendered inoperative by bodily vertical movement of said bracket relative to said bearing blocks and between said flanges, and said bearing block spacing and the overall height of the bosses on said bracket being arranged to permit angular regulation of said bracket upon said bosses with respect to the flanges of said vehicle bed through the release of said detent means upon bodily vertical manipulation of said bracket, and said detent means comprising a downward projection upon a lower surface of said bracket and arranged radially outwardly from adjacent the lower bracket boss, and notches formed into the upper surface portion of the lower bearing block arranged in radial angular positions to be selectively engaged by said projection through bodily vertical manipulation of said bracket and its associated bosses between said vertically spaced flanges, one of said notches having both sides sloping to permit actuation of said bracket in either direction, and the other of said notches being sloped on one side only to provide inoperative nesting stops for said bracket but to permit swinging of the bracket into an extended position relative to said bed.

References Cited in the file of this patent
UNITED STATES PATENTS

| | | |
|---|---|---|
| 708,666 | Rodriguez | Sept. 9, 1902 |
| 1,147,944 | Holdensen | July 27, 1915 |
| 1,537,162 | Fowler | May 12, 1925 |
| 1,662,833 | Reid | Mar. 20, 1928 |
| 2,145,782 | Townsend | Jan. 31, 1939 |
| 2,411,448 | McLean | Nov. 19, 1946 |
| 2,488,316 | Mosby | Nov. 15, 1949 |